United States Patent [19]

Moser et al.

[11] Patent Number: 5,037,964

[45] Date of Patent: Aug. 6, 1991

[54] METAL-FREE SULFO GROUP-FREE BASIS DISAZO AND TRISAZO COMPOUNDS CONTAINING TWO DIFFERENT 6-HYDROXYPYRID-2-ONE COUPLING COMPONENT RADICALS

[75] Inventors: Helmut A. Moser, Oberwil, Switzerland; Roland Wald, Huningue, France

[73] Assignee: Sandoz Ltd., Basel, Switzerland

[21] Appl. No.: 920,820

[22] Filed: Oct. 17, 1986

Related U.S. Application Data

[63] Continuation of Ser. No. 794,193, Nov. 1, 1985, abandoned.

[30] Foreign Application Priority Data

Nov. 8, 1984 [DE] Fed. Rep. of Germany ....... 3440802

[51] Int. Cl.[5] ...................... C09B 44/02; C09B 44/12; D06P 1/47; D21H 21/28

[52] U.S. Cl. .................................... 534/608; 534/581; 534/600; 534/602; 534/605; 534/606; 534/613; 546/257

[58] Field of Search ................ 534/605, 606, 608, 613

[56] References Cited

U.S. PATENT DOCUMENTS 3,852,261 12/1974 Steinemann ......................... 260/156
4,087,244 5/1978 Greve et al. .............................. 8/41
4,468,347 8/1984 Doswald et al. .................... 260/147
4,550,158 10/1985 Doswald et al. .................... 534/605
4,742,161 5/1988 Dore .................................. 534/606

FOREIGN PATENT DOCUMENTS 92520 10/1983 European Pat. Off. ............ 534/605

*Primary Examiner*—Mary C. Lee
*Assistant Examiner*—Fiona T. Powers
*Attorney, Agent, or Firm*—Gerald D. Sharkin; Richard E. Vila; Melvyn M. Kassenoff

[57] ABSTRACT

(i) Metal-free compounds of the formula

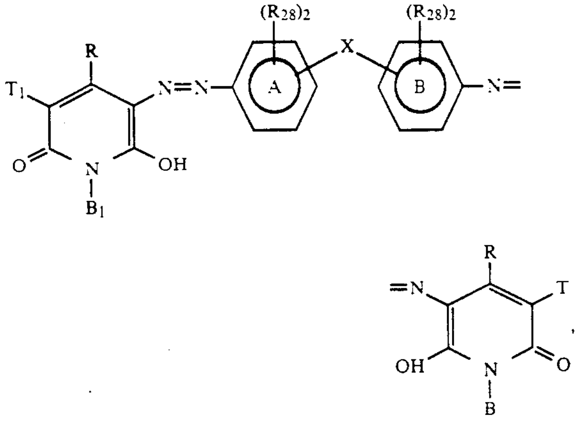

These compounds are useful as dyes for paper and textiles.

19 Claims, No Drawings

METAL-FREE SULFO GROUP-FREE BASIS DISAZO AND TRISAZO COMPOUNDS CONTAINING TWO DIFFERENT 6-HYDROXYPYRID-2-ONE COUPLING COMPONENT RADICALS

This application is a continuation of application Ser. No. 06/794,193, filed Nov. 1,1985 and now abandoned.

The invention relates to sulphonic acid group-free basic dyes useful for dyeing substrates such as textile and paper.

According to the invention there is provided compounds in free base or acid addition salt form and in metal-free 1:1 or 1:2 metal complex form, of formula I of which is unsubstituted or substituted by one to three groups selected from $C_{1-4}$alkyl, $C_{1-4}$alkoxy and halogen;

B has a significant of $B_1$ independently of $B_1$ or is $-N(R_7)_2$; $-A_2-N(R_7)_2$, or $-A_1R^{\oplus}(R_8)_2R_9A^{\ominus}$;

$A_1$ is $C_{2-8}$alkylene or $C_{2-8}$alkenylene;

$A_2$ is $C_{1-8}$alkylene or $C_{2-8}$alkenylene;

the alkylene groups of $A_1$ and $A_2$ being uninterrupted or interrupted by one $-NR_5$-group and optionally being substituted by one —OH;

each $R_7$, independently, is hydrogen, $C_{1-6}$alkyl, $C_{2-6}$alkyl substituted by halogen, —OH or —CN group; phenyl-($C_{1-3}$alkyl), the phenyl ring of which is unsubstituted or substituted by 1 to 3 groups selected from halogen, $C_{1-4}$alkyl and $C_{1-4}$alkoxy; or

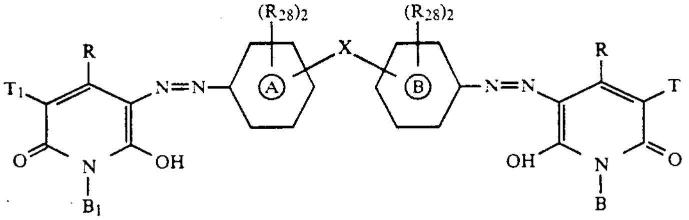

(I)

in which

R is hydrogen; $C_{1-4}$alkyl; $C_{5-6}$cycloalkyl unsubstituted or substituted by one or two $C_{1-4}$alkyl groups; phenyl, benzyl or phenylethyl, the phenyl group of the latter three substituents being unsubstituted or substituted by one or two groups selected from methyl, ethyl, methoxy and ethoxy;

$T_1$ is hydrogen, —CN, $-COOR_4$, $-CON(R_5)_2$ or $-SO_2N(R_5)_2$;

T has a significance of $T_1$ (independently of $T_1$) or is

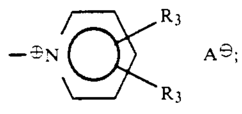

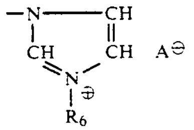

or

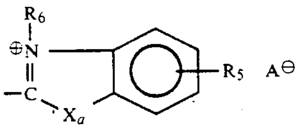

$X_a$ is —C—, $-NR_5-$ or —S—;

$R_3$ is hydrogen, $C_{1-4}$alkyl, $-N(R_5)_2$ or $-CON(R_5)_2$;

$R_4$ is $C_{1-6}$alkyl or phenyl ($C_{1-3}$alkyl);

$R_5$ is hydrogen or $C_{1-4}$alkyl; or when two $R_5$'s are present attached to a nitrogen atom, both $R_5$'s together with the N-atom to which they are attached may form a saturated ring which contains one to three heteroatoms.

$R_6$ is $C_{1-4}$alkyl;

$B_1$ is hydrogen; $C_{1-4}$alkyl unsubstituted or substituted by a $C_{1-4}$alkoxy or hydroxy group; $C_{5-6}$-cycloalkyl unsubstituted or substituted by one to three $C_{1-4}$alkyl groups or phenyl ($C_{1-3}$alkyl), the phenyl group $C_{5-6}$cycloalkyl, unsubstituted or substituted by 1 or 3 $C_{1-4}$alkyl groups;

or both $R_7$'s together with the N-atom to which they are attached form a 5- or 6-membered saturated ring which contains one to three heteroatoms (hereinafter referred to as a cyclic significance of $R_7$);

each $R_8$ independently has one of the non-cyclic or cyclic significances of $R_7$ except hydrogen and $R_9$ is $C_{1-4}$alkyl unsubstituted or substituted by phenyl; or both $R_8$ groups, $R_9$ and the N-atom to which they are attached form a pyridinium group (attached by its N-atom) unsubstituted or substituted by one or two $C_{1-4}$alkyl groups; when the $R_8$'s have a cyclic significance of the $R_7$'s together with $R_9$ and the nitrogen atom to which they are joined, they preferably form a group $\beta$

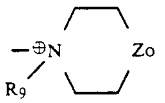

($\beta$)

where ZO is —O—, a direct bond, —NH—

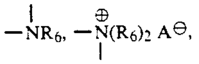

$-SO_2-$, —SO—, —S—, or $-CH_2-$;

each $R_{28}$ independently is selected from hydrogen, halogen, —OH, $C_{1-4}$alkyl and $C_{1-4}$alkoxy; and X, when all four $R_{28}$ groups are hydrogen, is selected from $X_1$ to $X_{61}$, $X_{64}$ and $X_{100}$ to $X_{109}$;

where $X_1$ is a direct bond, $X_2$ is a linear or branched $C_{1-4}$alkylene, $X_3$ —CO—, $X_4$ 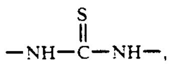, $X_5$ —S—, $X_6$ —O—, $X_7$ —CH=CH—, $X_8$ —S—S—.

-continued
$X_9$ $-SO_2-$, $X_{10}$ $-NH-$, $X_{11}$ $-CO-NH-$, $X_{12}$ 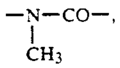 $X_{13}$ 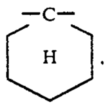
$X_{14}$ 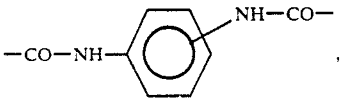 , $X_{15}$ 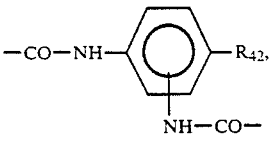 $X_{16}$ 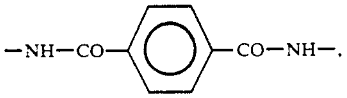
$X_{17}$ $-SO_2-NH-$, $X_{18}$ 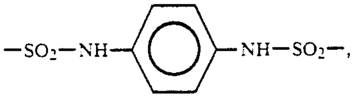 $X_{19}$ 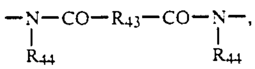
$X_{20}$ 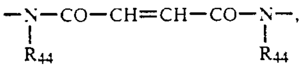 $X_{21}$ 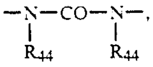 $X_{22}$ $-CO-NH-NH-CO-$,
$X_{23}$ $-CH_2CO-NH-NH-CO-CH_2-$, $X_{24}$ $-CH{=}CH-CO-NH-NH-CO-CH{=}CH-$,
$X_{25}$ 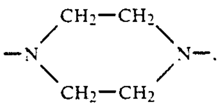 $X_{26}$ 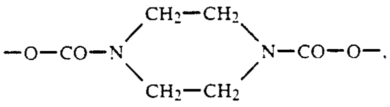 $X_{27}$ 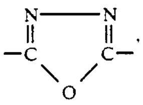
$X_{28}$ 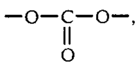 $X_{29}$ 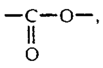 $X_{30}$ 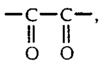 $X_{31}$ $-O-(CH_2)_g-O-$, $X_{32}$ 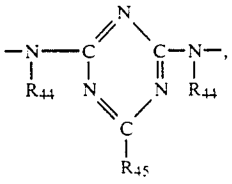
$X_{33}$ 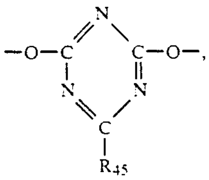 $X_{34}$ 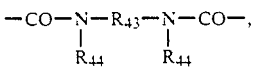 $X_{35}$ 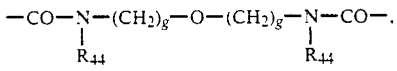
$X_{36}$ 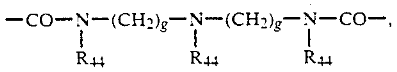 $X_{37}$ 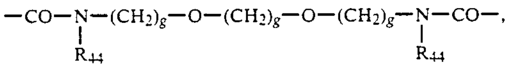
$X_{38}$ 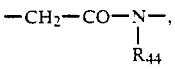 $X_{39}$ 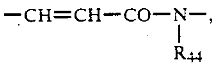 $X_{40}$ $-N{=}N-$, $X_{41}$ $-CH_2-S-CH_2-$, $X_{42}$ $-SO-$,
$X_{43}$ $-CH_2-SO-CH_2-$, $X_{44}$ $-CH_2-SO_2-CH_2-$, $X_{45}$ $-CH_2-NH-CO-NH-CH_2-$,
$X_{46}$ $-CH_2-NH-CS-NH-CH_2-$, $X_{47}$ 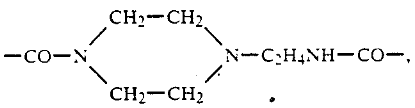 $X_{48}$ 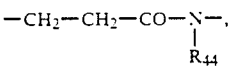
$X_{49}$ $-CH_2-CO-CH_2-$, $X_{50}$ $-CH{=}CH-CH{=}CH-$, $X_{51}$ 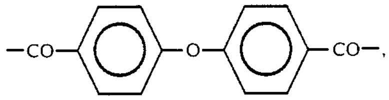
$X_{52}$ 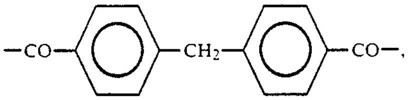 $X_{53}$ 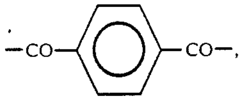

-continued $X_{54}$ 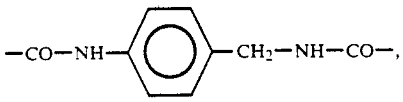 $X_{55}$ 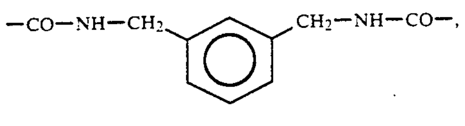

$X_{56}$ 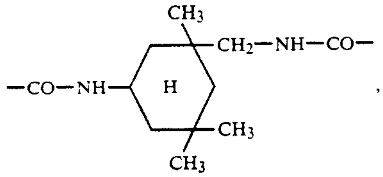, $X_{57}$ 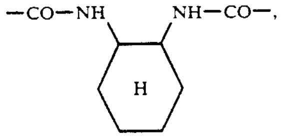 $X_{58}$ $-CH_2-CO-$, $X_{59}$ $-CH=CH-CO-CH=CH-$, $X_{60}$ 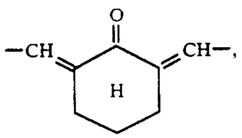 $X_{61}$ 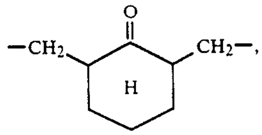

$X_{64}$ $-CO-NH-R_{43}-CO-NH-$, $X_{100}$ $-CO-NH-R_{43}-CO-NH-R_{43}-NH-CO-$,
$X_{101}$ $-CO-NH-R_{43}-NH-CO-CH_2-CH_2-CO-NH-R_{43}-NH-CO-$,
$X_{102}$ $-CO-NH-R_{43}-NH-CO-CH=CH-CO-NH-R_{43}-NH-CO-$, $X_{103}$ 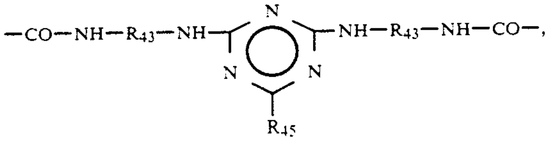 $X_{104}$ $-SO_2-NR_{44}-(CH_2)_g-NR_{44}-SO_2-$, $X_{105}$ $-CO-NR_{44}-R_{43}-O-CO-$, $X_{106}$ 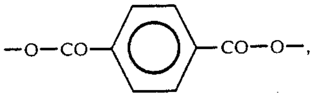 $X_{107}$ 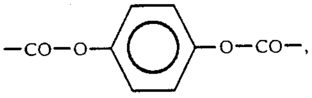

$X_{108}$ $-CONH-R_{43}-NH-CO-NH-R_{43}-NH-CO-$, $X_{109}$ 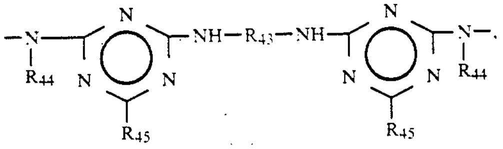

wherein $R_{42}$ is halogen, $C_{1-4}$alkyl or $C_{1-4}$alkoxy,
each $R_{43}$ independently is linear or branched $C_{1-4}$alkylene,
each $R_{44}$ independently is hydrogen or $C_{1-4}$alkyl,
each g is independently 1,2,3 or 4,
each $R_{45}$ independently is halogen, $-NH-CH_2-CH_2-OH$, $-N(CH_2-CH_2-OH)_2$, $-NH_2$, $-OH$, $-NH-(CH_2)_{2-3}N(C_2H_5)_2$,

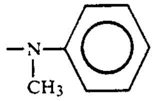, 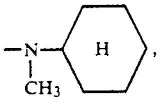, 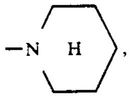, $-OCH_3$, $-OC_2H_5-$ or 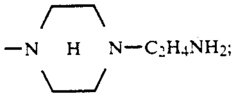;

or X, when at least one $R_{28}$ is other than hydrogen, is selected from $X_1$, $X_2$, $X_{11}$, $X_{12}$, $X_{14}$, $X_{15}$, $X_{17}$-$X_{21}$, $X_{25}$, $X_{32}$, $X_{34}$, $X_{57}$, $X_{64}$ and $X_{103}$;
with the provisos that (i) the pyridone group containing $B_1$ has no water-solubilising protonatable basic or cationic group; and (ii) the pyridone group containing B has at least one water-solubilising protonatable group or at least one water solubilising cationic group.

For the avoidance of doubt, in X where the bridging group is asymmetric, it can be attached to phenyl group A at either end. For avoidance of doubt, a compound of formula I can be present in a mixture which may include one or more other compounds of formula I or not of Formula I.

When the compounds of formula I are in 1:1 metal complex form, preferably the metal atom is copper, zinc, chromium, cobalt, nickel, iron or manganese and when the compounds of formula I are in 1:2 metal complex form, preferably the metal atom is chromium, nickel, cobalt or iron.

In the specification halogen means fluorine, chlorine, bromine or iodine, preferably chlorine.

The term "protonatable basic group" includes protonatable primary, secondary and tertiary amino groups and the term "cationic group" includes quaternary ammonium groups.

Where any symbol appears more than once in a formula unless indicated to the contrary its significances are independent of one another.

Any alkyl, alkylene or alkenylene present (capable of being linear or branched) is linear or branched unless indicated otherwise. The alkyl group of any alkoxy group is linear or branched unless indicated to the contrary.

R is preferably R' where R' is methyl, ethyl, unsubstituted phenyl, unsubstituted benzyl or unsubstituted cyclohexyl. More preferably R is R'' where R'' is methyl or unsubstituted phenyl.

$T_1$ is preferably $T_1'$ where $R_1'$ is hydrogen, —CN or $—CON(R_5')_2$ where $R_5'$ is defined below. T is preferably R' has a significance of $R_1'$ independently of $R_1'$ or is

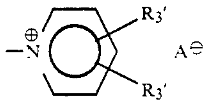

where $R_3'$ is defined below.

$T_1$ is more preferably $T_1''$ where $T_1''$ is hydrogen, —CN or $—CONH_2$. T is more preferably T'' where R'' is hydrogen, —CN or

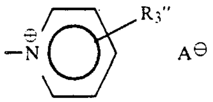

where $R_3''$ is defined below.

$B_1$ is preferably $B_1'$ where $B_1'$ is hydrogen, methyl, ethyl, $—CH_2OH$, $—C_2H_4OH$, cyclohexyl, benzyl, $—C_2H_4OCH_3$ or $—C_2H_4OC_5$. $B_1$ is more preferably $B_1''$ where $B_1''$ is hydrogen, methyl, ethyl, benzyl, $—C_2H_4OCH_3$ or $—CH_2OH$.

B is preferably B' where B' is hydrogen, $—CH_2OH$, $—CH_3$, $—C_2H_5$, $—C_2H_4OH$, unsubstituted cyclohexyl, benzyl, $—(CH_2)_{1-3}-N(R_7')_2$ or $—(CH_2)_{2-3}N^{\oplus}(R_8')_2R_9'A^{\ominus}$, where the symbols are defined below. B is more preferably B'' where B'' is hydrogen, $—CH_3$, $—C_2H_5$, benzyl, $—CH_2OH$, $—(CH_2)_{2-3}N(R_7'')_2$ or $—(CH_2)_{2-3}N^{\oplus}(R_8'')_2R_9''A^{\ominus}$.

Preferably $R_{28}$ is $R_{28}'$ where $R_{28}'$ is hydrogen, chloro, —OH, methyl or methoxy.

Preferably $R_3$ is $R_3'$ where $R_3'$ is hydrogen, methyl, ethyl, $—NH_2$, $—N(CH_3)_2$, $—CON(CH_3)_2$ or $—CON(C_2H_5)_2$. More preferably $R_3$ is $R_3'$ where $R_3''$ is hydrogen or methyl.

Preferably $R_5$ is $R_5'$ where $R_5'$ is hydrogen, methyl or ethyl, or when two $R_5'$ groups are present attached to a nitrogen atom, both $R_5''$ groups together with the N-atom form an unsubstituted pyrrolidine, piperidine, morpholine, piperazine or N-methylpiperazine group. Most preferably $R_5$ is $R_5''$ where $R_5''$ is hydrogen or methyl.

Preferably $R_6$is $R_6'$ where $R_6'$ is methyl or ethyl.

Preferably $R_7$ is $R_7'$ where $R_7'$ is hydrogen, linear or branched $C_{1-6}$alkyl, unbranched hydroxy $C_{2-3}$alkyl, benzyl, 2-chloroethyl or 2-cyanoethyl (hereinafter referred to as the non-cyclic significances of $R_7''$ or both $R_7'$ groups together with the N-atom to which they are attached form a pyrrolidine, piperidine, morpholine, piperazine or N-methylpiperazine group.

More preferably $R_7$ is $R_7''$ where $R_7''$ is hydrogen, methyl, ethyl or 2-hydroxyethyl (hereinafter referred to as the non-cyclic significances of $R_7''$ or both $R_7''$ groups together with the N-atom to which they are attached form morpholine, piperidine, piperazine or N-methylpiperazine;

Preferably $R_8$ is $R_8''$ where $R_8'$ is one of the non-cyclic significances of $R_7'$ except hydrogen and $R_9$ is $R_9'$ where $R_9'$ is methyl, ethyl, propyl or benzyl or both $R_8'$ and $R_9'$ together with the N-atom to which they are attached form a pyridinium ring unsubstituted or substituted by one or two methyl groups or a group β'

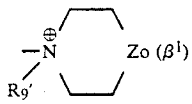

where Zo is —O—, a direct bond; $—CH_2—$, —NH—,

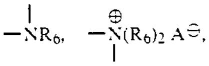

$—SO_2—$, —SO— or —S—.

More preferably $R_8$ is $R_8''$ where $R_8''$ is one of the cyclic or non-cyclic significances of $R_7''$ except hydrogen and $R_9$ is $R_9''$ where $R_9''$ is $—CH_3$, $—C_2H_5$ or benzyl or both $R_8''$ and $R_9''$ groups together with the N-atom to which they are attached form a pyridinium ring, unsubstituted or substituted by one or two methyl groups, or a group β' defined above.

X is preferably X' where X', when all four $R_{28}$'s are hydrogen, is selected from $X_1$, $X_5$, $X_6$, $X_7$, $X_{10}$, $X_{11}$, $X_{12}$, $X_{16}$, $X_{17}$, $X_{22}$, $X_{25}$, $X_{26}$, $X_{27}$, $X_{30}$, $X_{31}$, $X_{49}$, $X_{50}$, $X_{51}$, $X_{52}$, $X_{53}$, $X_{54}$, $X_{58}$, $X_{59}$, $X_{64}$, $X_{101}$ (where $R_{43}$is $—(CH_2)_{1-2}—$), $X_{103}$ (where $R_{43}$is $—(CH_2)_{102}—$ and $R_{45}$ is $—NH(CH_2)_{203}—N(C_2H_5)_2$), $X_{104}$ (where $R_{44}$=H and g=2 or 3), $X_{108}$ (where $R_{43}$ is $—(CH_2)_{1-3}—$), $XX_{70-90}$ and $XX_{110}$, where $X_{70-90}$ and $X_{110}$ are as defined below:

$X_{70}$ —NH—CO—NH—, $X_{71}$ 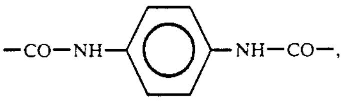

$X_{72}$ 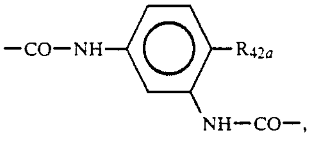

$X_{73}$ $—NH—CO—CH_2—CH_2—CO—NH—$, $X_{74}$ —NH—CO—CH=CH—CO—NH—, $X_{75}$ $—NH—CO—(CH_2)_4—CO—NH—$, $X_{76}$ 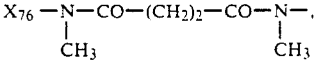

$X_{77}$ 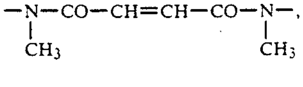

-continued $X_{78}$ 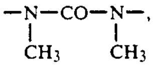, $X_{79}$ 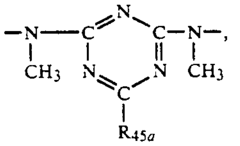, $X_{80}$ 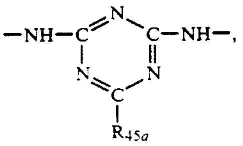, $X_{81}$ $—CH_2—$, $X_{82}$ $—(CH_2)_2—$, $X_{83}$ $—(CH_2)_3—$, $X_{84}$ $—(CH_2)_4—$, $X_{85}$ $—CO—NH—(CH_2)_2—NH—CO—$, $X_{86}$ $—CO—NH—(CH_2)_3—NH—CO—$, $X_{87}$ $—CO—NH—(CH_2)_4—NH—CO—$, $X_{88}$ 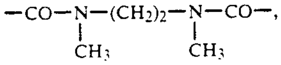, $X_{89}$ 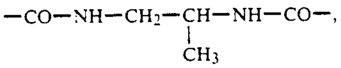, $X_{90}$ 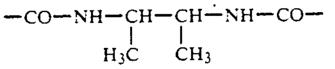 and $X_{110}$

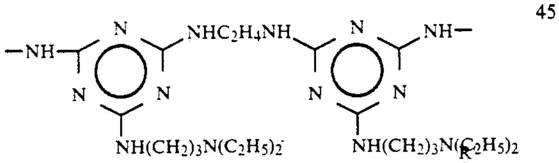

or X'm when at least one $R_{28}$ is other than hydrogen, is $X_1$, $X_{11}$, $X_{12}$, $X_{17}$, $X_{64}$, $X_{70}$, $X_{71}$, $X_{74}$, $X_{80}$, $X_{81}$, $X_{82}$, $X_{85}$, $X_{86}$, $X_{88}$ or $X_{103}$, where the symbols X are above defined, where $R_{42a}$ is hydrogen, Cl, $—CH_3$ or $—OCH_3$, $R_{45a}$ i Cl, $—NH(CH_2)_2OH$,

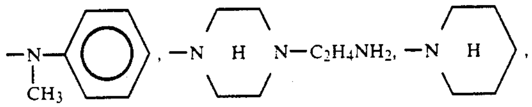, $—OCH_3$, $—OH$, $—NH_2$, $—N(CH_2CH_2OH)_2$

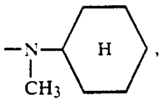, $—NH(CH_2)_3N(C_2H_5)_2$ or $—OC_2H_5$.

More preferably X is X'' where X'', when all four $R_{28}$'s are hydrogen, is $X_1$, $X_{11}$, $X_{17}$, $X_{27}$, $X_{51}$, $X_{52}$, $X_{54}$, $X_{64}$, $X_{70}$ to $X_{77}$, $X_{79}$, $X_{80}$, $X_{82}$, $X_{85}$ to $X_{90}$ or $X_{110}$; or X'' when at least one $R_{28}$ is other than hydrogen, is $X_1$, $X_{11}$, $X_{17}$, $X_{64}$, $X_{71}$, $X_{80}$, $X_{82}$ or $X_{85}$, the symbols X being as defined above.

Preferred compounds of formula I are those in free base or acid addition salt form and in metal-free, 1:1 or 1:2 metal complex form of formula II

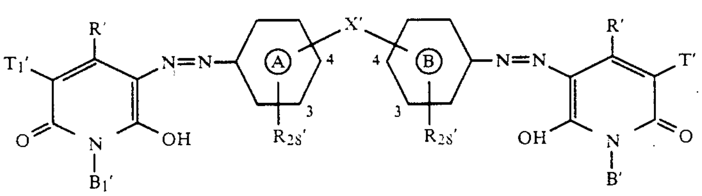

(II)

where the symbols are as defined above and with the provisos that (i) on rings A and B independently, X' is attached in the 3 or 4 position (shown), (ii) the pyridone group containing $B_1'$ has no water-solubilising protonatable basic or cationic group, and (iii) the pyridone group containing B' has at least one water-solubilising protonatable basic group or at least one water-solubilising cationic group.

More preferred compounds of formula I are those in free base or acid addition salt form and in metal-free, 1:1 or 1:2 metal complex form of formula III

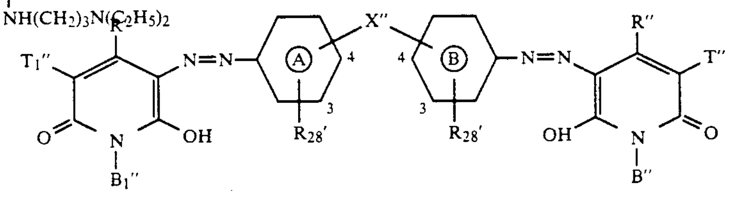

(III)

in which the symbols are as defined above and with the provisos that (i) on rings A and B independently, X' is attached in the 3 or 4 position (shown), (ii) the pyridone group containing $B_1'$ has no water-solubilising protonatable basic or cationic group, and (iii) the pyridone group containing B' has at least one water-solubilising protonatable basic group or at least one water-solubilising cationic group.

Preferred compounds of formula I in 1:1 or 1:2 metal complex form and in free base or acid addition salt form are of formula IV

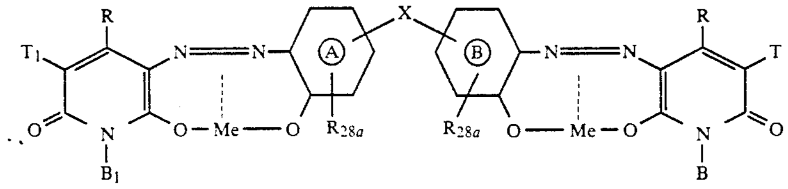

(IV)

in which $R_{28a}$ is hydrogen, halogen or $C_{1-4}$alkyl;

Me when the compound of formula IV is in 1:1 metal complex form, is copper, zinc, chromium, manganese, cobalt, iron or nickel and, when the compound of formula IV is in 1:2 metal complex form, is chromium, iron, nickel or cobalt, and the remaining symbols are as defined above.

Preferably Me, when the compound of formula I is in 1:1 metal complex form, is copper or iron and, when the compound of formula I is in 1:2 metal complex form, Me is cobalt or iron.

More preferred compounds of formula I in 1:1 or 1:2 metal complex form are those of formula IV in which R is R'; $T_1$ is $R_1'$; $B_1$ is $B_1'$; T is T'; X is X'; and B is B'; the symbols being as defined above.

Most preferred compounds of formula I in 1:1 or 1:2 metal complex form are those of formula IV in which R is R"; $R_1$ is $R_1$"; $B_1$"is B"; T is T"; X is X" and B is B"; the symbols being as defined above.

Further, according to the invention there is provided a process for preparing compounds of formula I comprising coupling 1 mole of a tetraazotised compound of formula VI

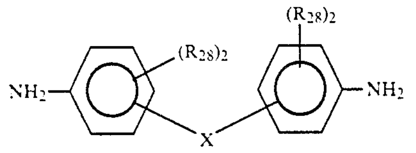

(VI)

to 1 mole of a compound of formula VII

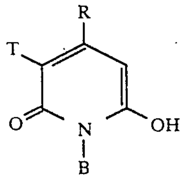

(VII)

and 1 mole of a compound of formula VIII

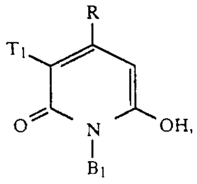

(VIII)

Compounds of formulae VI, VII and VIII are known or may be made by known methods from known compounds.

Coupling to form compounds of formula I can be carried out according to known methods. Advantageously, coupling is carried out in aqueous (acid, neutral or alkali) medium at a temperature from −10° C. to room temperature, if necessary in the presence of a coupling accelerator such as pyridine or urea. Alternatively, coupling may be effected in a mixture of solvents, for example, water and an organic solvent.

Metallisation of the compounds of formula I can be achieved by known methods.

The azo compounds of formula I in 1:1 metal complex form may be prepared by metallising compounds of formula I in metal-free form with a metal selected from copper, cobalt, iron, nickel, manganese, chromium and zinc., The azo compounds of formula I in 1:2 metal complex form may be prepared by metallising compounds of formula I in metal-free form with a metal selected from chromium, nickel, cobalt and iron.

A further method for the preparation of an azo compound of formula I in 1:2 metal complex form is reacting an azo compound of formula I in metal-free form with an azo compound 1:1 metal complex when the metal is chromium, nickel, cobalt or iron.

The metallisation process to form a 1:1 metal complex is advantageously carried out by treating 1 mole of azo compound with a metallising agent containing 1 equivalent of metal.

1:1 Metal complex formation using copper can be carried out by directly reacting a compound of formula I with a metal salt or by oxidative coppering preferably at 40°-70° C. and at a pH of 4-7 in the presence of a Cu(II) salt or with copper filings in the presence of $H_2O_2$ or any other oxidizing material or demethylating coppering can be effected in a pH range of 3-4.

Metallisation is carried out advantageously in aqueous medium or in a mixture of water and a water-miscible organic solvent, for example, acetone, lower alkyl alcohols, dimethylformamide, formamide, glycols or acetic acid at a pH range from 1.0 to 8.0, preferably pH 2 to 7. The metallisation process may be carried out at a temperature from room temperature to the boiling point of the reaction medium.

Alternatively, metallisation may be effected in a wholly organic medium (for example dimethylformamide). Advantageously, for instance, cobaltisation may be carried out in the presence of an inorganic nitrite such as lithium, sodium, ammonium or potassium nitrite in the ratio of 2 to 6 moles of nitrite per gram atom of cobalt.

Suitable cobalt-yielding compounds are, for example, cobalt(II) and Co(III) sulphate, acetate, formate or chloride.

Copper-yielding compounds are, for example, cupric sulphate, cupric formate, cupric acetate and cupric chloridate.

The nickel-yielding compounds are Ni(II) or Ni(III) compounds, such as nickel formate, nickel acetate and nickel sulphate.

Preferred manganese-yielding compounds are Mn(II) compounds and iron-yielding compounds are Fe(II) or Fe(III) compounds. Examples of these and zinc-yielding compounds are manganese, iron and zinc formate, acetate and sulphate.

Preferred chromium-yielding compounds are Cr(II) and Cr(III) formate, acetate and sulphate.

In the compounds of formula I, the anions $A^{\oplus}$ can be any nonchromophoric anions such as those conventional in basic dyestuff chemistry. Suitable anions include chloride, bromide, sulphate, formate, bisulphate, methylsulphate, aminosulphonate, perchlorate, benzenesulphonate, oxalate, maleate, acetate, propionate, lactate, succinate, tartrate, malate, methanesulphonate and benzoate as well as complex anions, for example zinc chloride double salts and anions of boric acid, citric acid, glycollic acid, diglycollic acid and adipic acid or addition products of ortho boric acids with polyalcohols with at least one cis diol group present. These anions can be exchanged for each other by ion exchange resins on reaction with acids or salts (for example via the hydroxide or bicarbonate) or according to German Offenlegungsschrift 2,001,748 or 2,001,816.

The azo compounds of formula I are suitably worked up into solid or liquid preparations, for example by granulation to form granulates in quaternised form and/or the salt of the corresponding mineral acid or organic acid or by dissolving in a suitable solvent. The compounds of formula I are suitable for dyeing, padding or printing on fibres, threads or textile materials, particularly natural or regenerated cellulose materials, for example cotton, or synthetic polyamides or synthetic polyesters in which the acid groups have been modified. Such a polyamide is described in U.S. Pat. No. 3,379,723.

The azo compounds of formula I may also be applied to bast fibres such as hemp, flax, sisal, jute, coir or straw.

The azo compounds of formula I are also used for dyeing, padding or printing fibres, threads or textiles produced therefrom which consist of or contain homo- or mixed polymers of acrylonitrile or of 1,1-dicyanoethylene.

The textile material is dyed, printed or pad-dyed in accordance with known methods. Acid modified-polyamide is dyed particularly advantageously in an aqueous, neutral or acid medium, at temperatures of 60° C. to boiling point or at temperatures above 100° C. under pressure.

The textile material may also be dyed by the compounds of formula I in organic solvents, e.g. in accordance with the directions given in German Offenlegungsschrift 2,437,549.

Cellulose material is mainly dyed by the exhaust process, i.e. from a long or short bath, at room temperature to boiling temperature, optionally under pressure, whereby the ratio of the bath is from 1:1 to 1:100 and preferably from 1:20 to 1:50. If dyeing is effected from a short bath, then the liquor ratio is 1:5 to 1:15. The pH of the dye bath varies between 3 and 10 (for short and long dyebaths).

Dyeing preferably takes place in the presence of electrolytes.

Printing may be effected by impregnation with a printing paste produced by known methods.

The dyes of formula I are also suitable for dyeing or printing paper, e.g. for the production of bulk-dyed, sized and unsized paper. The dyestuffs may similarly be used for dyeing paper by the dipping process. The dyeing of paper is effected by know methods.

The dyes of formula I are also suitable for dyeing or printing leather by known methods.

Dyeings with good fastness are obtained on both paper and leather.

Dyeings made with the dyes of formula I on leather have good light-fastness properties, good diffusion properties in PVC, good water-, wash- and sweat-fastness properties, good fastness to dry cleaning, good fastness to drops of water and to hard water and good fastness to milk, soap, NaOH, fruit juice and sweetened drinks. Further, they show a good nuance stability.

Dyeings prepared with dyes of formula I on paper produce a substantially clear spent liquor which is important for environmental reasons. The dyes of formula I have good build-up properties, do not run when applied to paper and are not pH sensitive. Dyeings produced with dyes of formula I have good light fastness and the nuance on exposure for a long time to light fades tone in tone. The dyes of formula I have good wet-fastness properties not only for water but also for milk, soap, water, sodium chloride solution, fruit juice, and sweetened mineral water. Further, dyeings made with dyes of formula I are fast to alcoholic beverages due to good alcohol fastness. Further the dyes of formula I have good nuance stability.

The dyes of formula I may be converted into solid or liquid preparations. Processing into stable liquid or solid dyeing preparations may take place in a generally known manner, advantageously by grinding or granulating (for solid preparations) or by dissolving in suitable solvents optionally adding an assistant, e.g. a stabiliser or dissolving intermediary such as urea (for liquid preparations). Such preparations may be obtained for example as described in French Patent Specifications 1,572,030 and 1,581,900 or in accordance with DOS 2,001,748 and 2,001,816.

Liquid dye compositions are preferably as follows:

1 Part by weight of a dye of formula I 0.01–1 Part by weight of an inorganic salt (preferably 0.01 to 0.1 parts)

0.01–1 Part by weight of an organic acid such as formic, acetic, lactic, citric, propionic or methoxyacetic acid 0.01–8 Parts by weight of water 0–5 Parts by weight of a solubilising agent such a glycols (diethylene glycol, triethylene glycol or hexylene glycol), glycol ethers such as Methyl Cellosolve®, Methyl Carbitol®, butylpolyglycol, urea, formate and dimethylformamide.

Solid dye compositions are preferably as follows:

1 Part by weight of a dye of formula I 0.01–1 Part by weight of an inorganic salt (preferably 0.01 to 0.1 parts)

0–8 Parts by weight of a preparation agent such as urea, dextrin, glucose or d-glucose).

The solid compositions may contain up to 20% water.

The new dyes are also useful for dyeing polyacrylonitrile or polyamide having modified anionic groups on polyester.

The invention will now be illustrated by the following Examples in which all parts and percentages are by weight and all temperatures are in °C.

EXAMPLE 1

25.7 Parts of 1-nitro-3'-aminobenzanilide are diazotised at 0°-5° in 200 parts of water and 30 parts of 30% HCl with 6.9 parts of sodium nitrite by known methods.

To the ice cooled diazo solution, 32.3 parts of the compound of formula 1a, (1a)

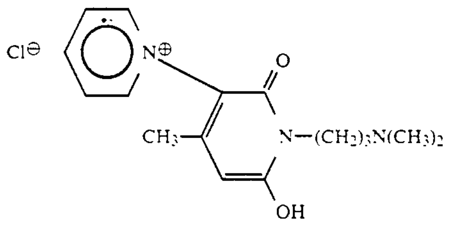

dissolved in 100 parts of water, are added dropwise. The resulting dyestuff is of formula 1b

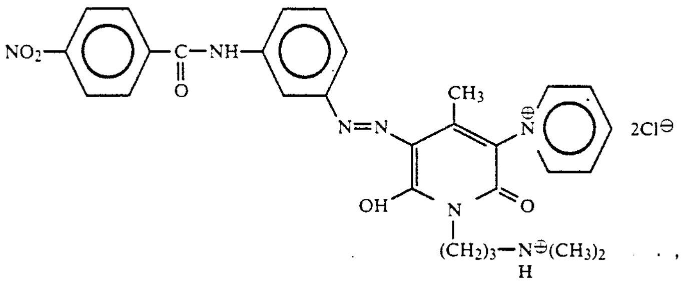

The pH is brought to 7 to 7.5 by the addition of a 30% NaOH solution. The nitro group is reduced by the dropwise addition of 9.5 parts of $Na_2S$ dissolved in 50 parts of water. The dyestuff precipitates out and is filtered and washed with 500 parts of water.

The damp dye is diazotised in 300 parts of water and 45 parts of 30% HCl with 6.9 parts of sodium nitrite at 0°-5° by known methods.

The orange-colored solution is added part by part to a solution of 500 parts water, 106 parts sodium carbonate and 16.8 parts of 6-hydroxy-4-methyl-3-carbonamidopyridone.

The precipitated dyestuff is filtered and washed with neutral water. The residue dissolves in a mixture of lactic acid and water with yellow colour. A dyestuff of the formula 1c (1c)

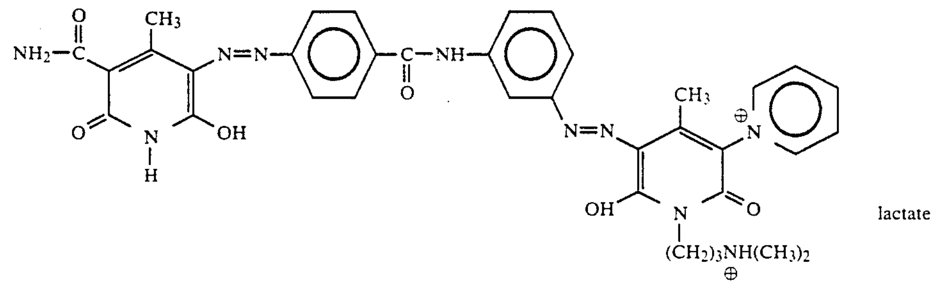

results that dyes paper a yellow tone. The resulting dyeings have good wet-fastness properties, good light-fastness properties and leave a colourless spent liquor. On paper the dyes build-up well. The dye has good solubility properties and can be dissolved in dilute formic acid, acetic acid or methoxyacetic acid.

EXAMPLE 2

Instead of the 1-nitro-3+-aminobenaznilide, 26.9 parts of 1-acetylamino-3'-aminobenzanilide are employed in the procedure of Example 1. After diazotisation and coupling the compound of formula 2

(2a)

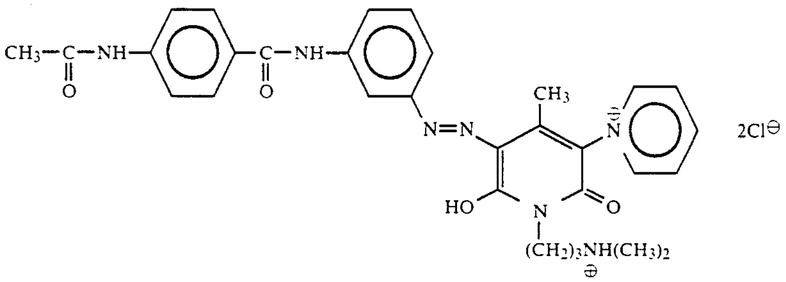

results.

To the dye solution, 70 parts of HCl (about 30%) is added and the mixture is stirred for 3 hours at 35°-40°. Upon the addition of 6.9 parts of sodium nitrite at 0°-4°, diazotisation occurs. The orange diazo solution is then coupled to 6-hydroxy-4-methyl-3-carbonamidopyridone according to Example. After isolation to form the dye of Example 1 (i.e. of formula 1c) which is isolated.

EXAMPLES 3 TO 44

Compounds of the formula

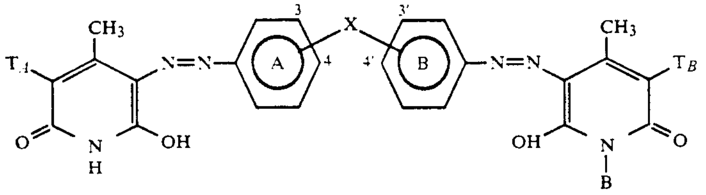

in which the symbols are defined in Table 1 below can be prepared by a method analogous to that of Examples 1 and 2 from suitable reagents.

In the following Table the symbols used are:

$T_1$ is 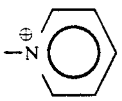 $A^{\ominus}$ $T_2$ is 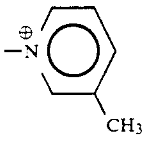 $A^{\ominus}$ $T_3$ is 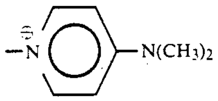 $A^{\ominus}$ -continued $T_4$ is 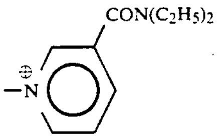 $A^{\ominus}$ $T_5$ is 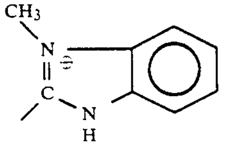 $A^{\ominus}$ $T_6$ is 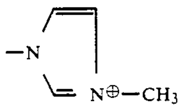 $A^{\ominus}$ $T_7$ is —CN
$T_8$ is $-CONH_2$
$M_2$ is $-CH_2CH_2OH$
$M_3$ is $-(CH_2)_2-N(CH_3)_2$
$M_4$ is $-(CH_2)_3-N(CH_3)_2$
$M_5$ is $-(CH_2)_2-N^{\oplus}(CH_3)_3A^{\ominus}$
$M_6$ is $-(CH_2)_3-N^{\oplus}(CH_3)_3A^{\ominus}$
$M_7$ is $-CH_2OH$.

TABLE

| Ex. No. | $T_A$ | $T_B$ | B | position of X on phenyl ring A | X | position of X on phenyl ring B |
|---|---|---|---|---|---|---|
| 3 | H | $T_1$ | H | 4- | —CONH— | 3' |
| 4 | H | $T_2$ | H | " | " | " |
| 5 | H | $T_3$ | H | " | " | " |
| 6 | H | $T_4$ | H | " | " | " |
| 7 | H | $T_5$ | H | " | " | " |
| 8 | H | $T_6$ | H | " | " | " |
| 9 | H | $T_1$ | $M_4$ | " | " | " |
| 10 | $T_7$ | $T_1$ | $M_6$ | " | " | " |
| 11 | $T_7$ | $T_1$ | $M_3$ | " | " | " |
| 12 | $T_8$ | $T_1$ | $M_6$ | " | " | " |
| 13 | $T_8$ | $T_2$ | $M_7$ | " | " | " |
| 14 | $T_8$ | $T_1$ | $M_2$ | " | " | " |
| 15 | $T_8$ | $T_1$ | $M_3$ | " | " | " |
| 16 | $T_8$ | $T_1$ | $M_5$ | " | " | " |
| 17 | H | $T_1$ | $M_3$ | " | " | 4' |
| 18 | H | $T_2$ | $M_7$ | " | " | " |
| 19 | $T_7$ | $T_1$ | $M_4$ | " | " | " |
| 20 | $T_7$ | $T_2$ | H | " | " | " |
| 21 | $T_7$ | $T_1$ | $M_3$ | " | " | " |
| 22 | H | $T_1$ | $M_4$ | 3- | " | 3' |
| 23 | $T_7$ | $T_2$ | H | " | " | " |
| 24 | $T_8$ | $T_1$ | $M_4$ | " | " | 4' |
| 25 | H | $T_2$ | $M_4$ | 3- | —NHCO— | 4'- |
| 26 | $T_7$ | $T_3$ | H | " | " | " |
| 27 | $T_8$ | $T_1$ | $M_4$ | " | " | " |
| 28 | $T_8$ | $T_1$ | $M_6$ | " | " | " |
| 29 | H | $T_1$ | $M_4$ | 4- | $-CONHCH_2CH_2NHCO-$ | " |
| 30 | $T_7$ | $T_2$ | $M_6$ | " | " | " |
| 31 | $T_8$ | $T_1$ | $M_5$ | " | " | " |

TABLE-continued

| Ex. No. | $T_A$ | $T_B$ | B | position of X on phenyl ring A | X | position of X on phenyl ring B |
|---|---|---|---|---|---|---|
| 32 | H | $T_1$ | $M_4$ | 3- | 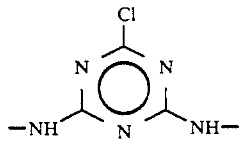 | 3'-. |
| 33 | $T_7$ | $T_2$ | $M_5$ | " | " | " |
| 34 | $T_8$ | $T_1$ | $M_6$ | " | " | " |
| 35 | H | $T_1$ | $M_7$ | " | 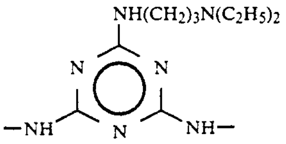 | " |
| 36 | $T_7$ | $T_2$ | H | " | " | " |
| 37 | $T_8$ | $T_1$ | H | " | " | " |
| 38 | H | $T_3$ | H | " | " | " |
| 40 | H | $T_4$ | H | " | 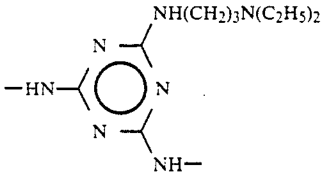 | " |
| 41 | H | $T_1$ | H | 3- | 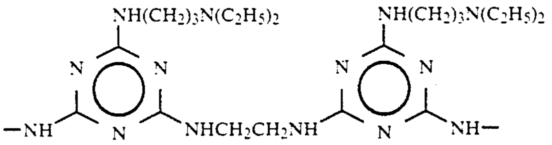 | 3'- |
| 42 | $T_8$ | $T_2$ | H | " | " | " |
| 43 | H | $T_1$ | H | 3- | 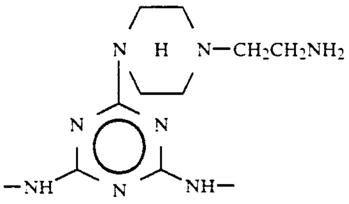 | 3' |
| 44 | $T_7$ | $T_2$ | H | " | " | " |
| 45 | $T_8$ | $T_1$ | $M_7$ | " | " | " |

In the following application examples the compounds of Examples 1 to 44 are added in acid addition salt form, where appropriate.

APPLICATION EXAMPLE A

70 Parts of chemically bleached sulphite cellulose obtained from pinewood and 30 parts of chemically bleached sulphite cellulose obtained from birchwood are ground in 2000 parts of water in a Hollander. 0.2 Part of the dye of Example 1 is added to this pulp. Paper is produced from this pulp after mixing for 20 minutes. The absorbent paper which is obtained in this manner is dyed a yellow tone and the waste water is practically colourless.

APPLICATION EXAMPLE B 0.5 Part of the dye of Example 1 is dissolved in 100 parts of hot water and cooled to room temperature. The solution si added to 100 parts of chemically bleached sulphite cellulose which have been ground in a Hollander with 2000 parts of water. Sizing takes place after a thorough mixing for 15 minutes. The paper which is produced from this material has a yellow tone of medium intensity and has good fastness properties.

APPLICATION EXAMPLE C

An absorbent web of unsized paper is drawn at a temperature of 40° to 50° through a dye solution having the following composition:

0.5 parts of the dyes mixture of Example 1
0.5 part of starch
99.0 part of water.

The excess dye solution is squeezed out through two rollers. The dried web of paper is dyed a yellow tone and has good fastness properties.

APPLICATION EXAMPLE D

2 Parts of the dye of Example 1 are dissolved in 4000 parts of demineralised water at 40° C. 100 Parts of a prewetted cotton textile substrate are added and the bath is raised to boiling point over 30 minutes and held at the boil for 1 hour, topping up with water where necessary. After removing the dyed web from the bath, washing and drying, a yellow dyeing is obtained with good light fastness and wet fastness properties. The dye exhaust practically totally and the waste water is practically colourless.

APPLICATION EXAMPLE

100 Parts of freshly tanned and neutralized chrome leather are agitated for 30 minutes in a vessel with a dyebath of 250 parts of water and 1 part of the dye of Example 1 at 55° C. and are then treated in the same bath for 30 minutes with 2 parts of an anionic fatty liquor based on sulphonated train oil. The leather is then dried and prepared in the normal way, giving a leather evenly dyed in a scarlet tone.

Other low affinity vegetable-tanned leathers can be similarly dyed by known methods.

Any one of the dyes of Examples 2 to 43 may be used in place of that of Example 1 in any one of Application Examples A to E.

What is claimed is:

1. A compound of the formula

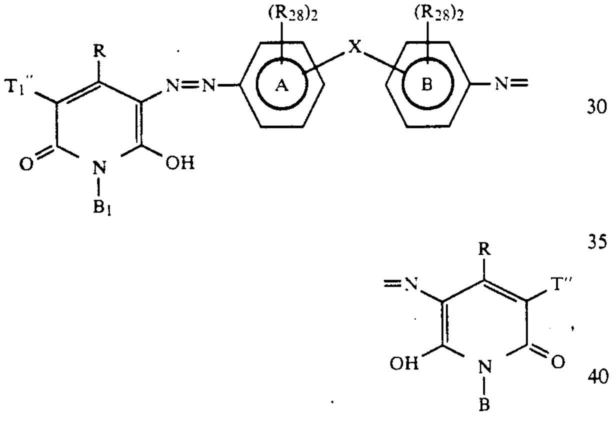

or an acid addition salt thereof, wherein

B is hydrogen; $C_{1-4}$alkyl; $C_{1-4}$alkyl monosubstituted by $C_{1-4}$alkoxy or hydroxy; $C_{5-6}$cycloalkyl; $C_{5-6}$cycloalkyl substituted by 1 to 3 $C_{1-4}$alkyl groups; phenyl($C_{1-3}$alkyl); phenyl($C_{1-3}$alkyl) the phenyl ring of which is substituted by 1 to 3 substituents selected from $C_{1-4}$alkyl, $C_{1-4}$alkoxy and halo; $-N(R_7)_2$; $-A_2-N(R_7)_2$ or $-A_1-N^{\oplus}(R_8)_2R_9A^{\ominus}$, wherein $A_1$ is linear or branched $C_{2-8}$alkylene; linear or branched $C_{2-8}$alkylene interrupted by one $-NR_5-$; linear or branched $C_{2-8}$alkylene monosubstituted by hydroxy; linear or branched $C_{2-8}$alkylene monosubstituted by hydroxy and interrupted by one $-NR_5-$; or linear or branched $C_{2-8}$alkenylene, $A_2$ is linear or branched $C_{1-8}$alkylene; linear or branched alkylene having a maximum of 8 carbon atoms and interrupted by one $-NR_5-$; linear or branched $C_{1-8}$alkylene monosubstituted by hydroxy; linear or branched alkylene having a maximum of 8 carbon atoms monosubstituted by hydroxy and interrupted by one $-NR_5-$; or linear or branched $C_{2-8}$alkenylene, each $R_7$ is independently hydrogen; $C_{1-6}$alkyl; $C_{2-6}$alkyl monosubstituted by halo, hydroxy or cyano; phenyl ($C_{1-3}$alkyl); phenyl($C_{1-3}$alkyl) the phenyl ring of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 or 3 $C_{1-4}$alkyl groups, or $-N(R_7)_2$ is a 5- or 6-membered saturated ring containing a total of 1 to 3 hetero atoms, each $R_8$ is independently $C_{1-6}$alkyl; $C_{2-6}$alkyl monosubstituted by halo, hydroxy or cyano; phenyl($C_{1-3}$alkyl); phenyl($C_{1-3}$alkyl) the phenyl ring of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, or $-N^{\oplus}(R_8)_2-$ is a 5- or 6-membered saturated ring containing a total of 1 to 3 hetero atoms, and $R_9$ is $C_{1-4}$alkyl or phenyl($C_{1-4}$alkyl), or $-N^{\oplus}(R_8)_2R_9$ is pyridinium or pyridinium substituted by 1 or 2 $C_{1-4}$alkyl groups, $B_1$ is hydrogen; $C_{1-4}$alkyl; $C_{1-4}$alkyl monosubstituted by $C_{1-4}$alkoxy or hydroxy; $C_{5-6}$cycloalkyl; $C_{5-6}$cycloalkyl substituted by 1 to 3 $C_{1-4}$alkyl groups; phenyl($C_{1-3}$alkyl) or phenyl ($C_{1-3}$alkyl) the phenyl ring of which is substituted by 1 to 3 substituents selected from $C_{1-4}$alkyl, $C_{1-4}$alkoxy and halo, each R is independently hydrogen; $C_{1-4}$alkyl; $C_{5-6}$cycloalkyl; $C_{5-6}$cycloalkyl substituted by 1 or 2 $C_{1-4}$alkyl groups; phenyl; phenyl substituted by 1 or 2 substituents selected from methyl, ethyl, methoxy and ethoxy; benzyl; phenylether; or benzyl or phenylethyl the phenyl ring of which is substituted by 1 or 2 substituents selected from methyl, ethyl, methoxy and ethoxy, each $R_{28}$ is independently hydrogen, halo, $C_{1-4}$alkyl or $C_{1-4}$alkoxy, T'' is hydrogen, cyano or

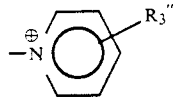 $A^{\ominus}$, wherein $R_3''$ is hydrogen or methyl, $T_1''$ is hydrogen, cyano or $-CONH_2$, and x is a direct bond, linear or branched $C_{1-4}$alkylene, $-CO-$, $-NH-C(=S)-NH-$, $-S-$, $-O-$, $-CH=CH-$, $-S-S-$, $-SO_2-$, $-NH-$, $-CO-NH-$, $-N(CH_3)-CO-$,

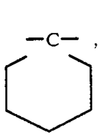 , 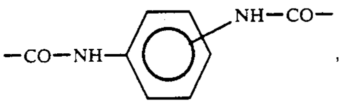 ,

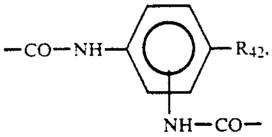

-continued
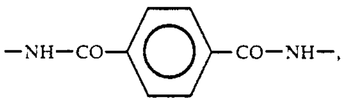
$-SO_2-NH-$,
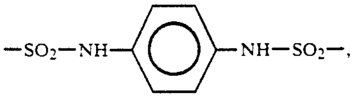
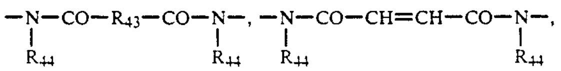
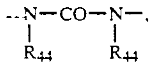
$-CO-NH-NH-CO-$,
$-CH_2CO-NH-NH-CO-CH_2-$,
$-CH=CH-CO-NH-NH-CO-CH=CH-$,
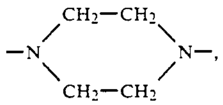
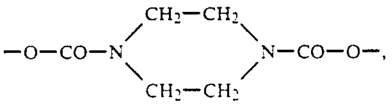
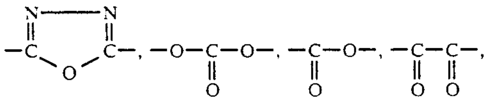
$-O-(CH_2)_g-O-$,
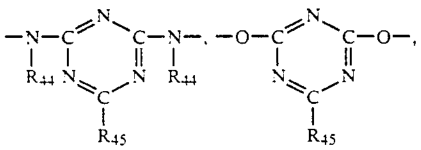
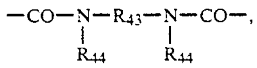
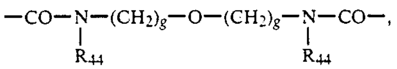
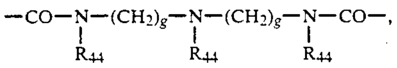
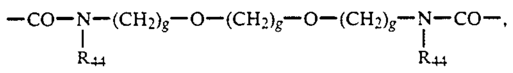
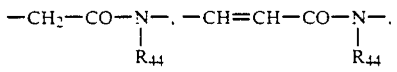
$-N=N-$, $-CH_2-S-CH_2-$, $-SO-$, $-CH_2-SO-CH_2-$,
$-CH_2-SO_2-CH_2-$, $-CH_2-NH-CO-NH-CH_2-$,
$-CH_2-NH-CS-NH-CH_2-$,
-continued
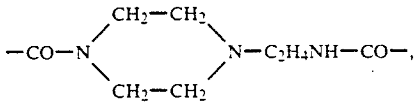
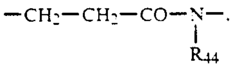
$-CH_2-CO-CH_2-$,
$-CH=CH-CH=CH-$,
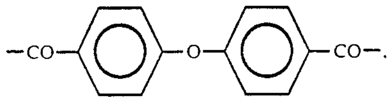
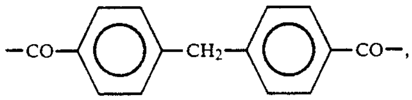
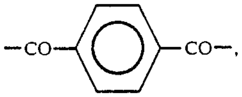
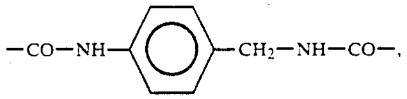
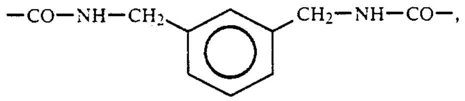
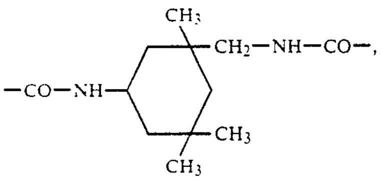
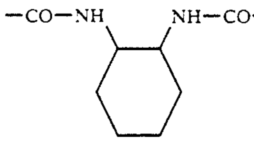
$-CH_2-CO-$,
$-CH=CH-CO-CH=CH-$,
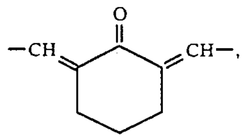
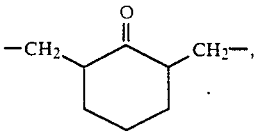
$-CO-NH-R_{43}-CO-NH-$,
$-CO-NH-R_{43}-CO-NH-R_{43}-NH-CO-$,
$-CO-NH-R_{43}-NH-CO-CH_2-CH_2-CO-NH-R_{43}-NH-CO-$,
$-CO-NH-R_{43}-NH-CO-CH=CH-CO-$ -continued

—NH—$R_{43}$—NH—CO—,

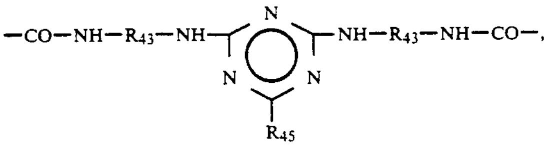

—$SO_2$—$NR_{44}$—$(CH_2)_g$—$NR_{44}$—$SO_2$—,

—CO—$NR_{44}$—$R_{43}$—O—CO—,

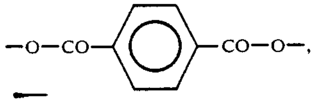

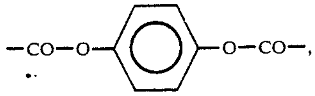

—CONH—$R_{43}$—NH—CO—NH—$R_{43}$—NH—CO— or

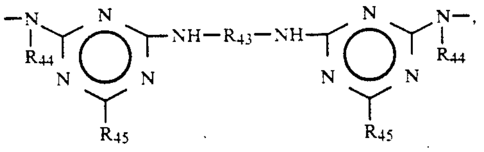

with the provisos that (i) when X is asymetric, either end is attached to Ring A and (ii) when at least one $R_{28}$ is other than hydrogen, X is a direct bond, linear or branched $C_{1-4}$alkylene, —CO—NH—,

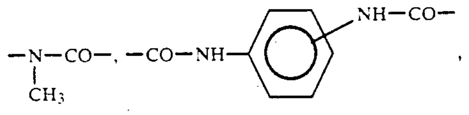

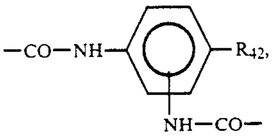

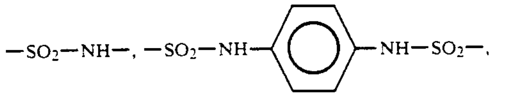

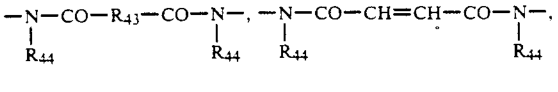

-continued

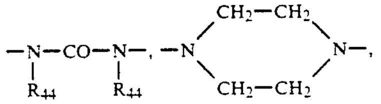

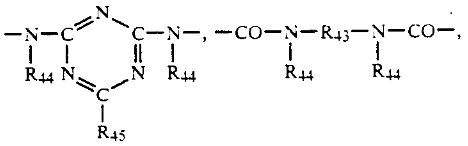

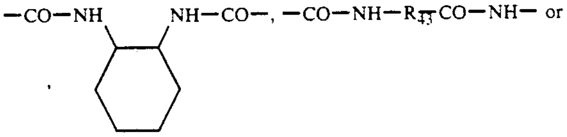

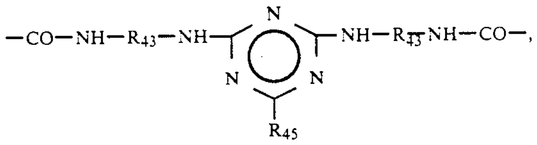

wherein $R_{42}$ is halo, $C_{1-4}$alkyl or $C_{1-4}$alkoxy, each $R_{43}$ is independently linear or branched $C_{1-4}$alkylene, each $R_{44}$ is independently hydrogen or $C_{1-4}$alkyl, each $R_{45}$ is independently halo, hydroxy, methoxy, ethoxy, amino, 2-hydroxyethylamino, N,N-di-(2-hydroxyethyl)amino, —NH—$(CH_2)_a$—$N(C_2H_5)_2$, N-methyl-N-phenylamino, N-cyclohexyl-N-Methylamino, piperidino or N-aminoethylpiperazino, wherein a is 2 or 3, and each g is independently 1, 2, 3 or 4, wherein $R_5$ is hydrogen or $C_{1-4}$alkyl, each $A^{\ominus}$ is independently a non-chromophoric anion, and each halo is independently fluoro, chloro, bromo or iodo, with the proviso that at least one of B and R″ is or contains a water-solubilizing protonatable group or a water-solubilizing cationic group.

2. A compound according to claim 1.

3. A compound according to claim 1 having the formula

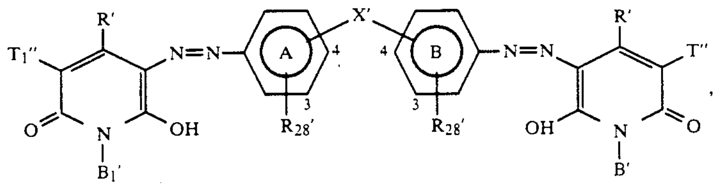

or an acid addition salt thereof, wherein

B′ is hydrogen, methyl, ethyl, hydroxymethyl, hydroxyethyl, cyclohexyl, benzyl, —$(CH_2)_b$—$N(R_7')_2$ or —$(CH_2)_a$—$N^{\oplus}(R_8')_2R_9'A^{\ominus}$, wherein each $R_7'$ is independently hydrogen, $C_{1-6}$alkyl, n-hydroxy($C_{2-3}$alkyl), benzyl, 2-chloroethyl or 2-cyanoethyl, or —$N(R_7')_2$ is pyrrolidino, piperidino, morpholino, piperazino or N-methylpiperazino, each $R_8'$ is independently $C_{1-6}$alkyl, n-hydroxy($C_{2-3}$alkyl), benzyl, 2-chloroethyl or 2-cyanoethyl, and $R_9'$ is methyl, ethyl, propyl or benzyl, or —$N(R_8')_2R_9'$ is pyridinium, pyridinium monosubstituted or disubstituted by methyl or

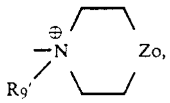

wherein

Zo is a direct bond, —$CH_2$—, —O—, —S—, —SO—, —$SO_2$—, —NH—, —$NR_6$— or —$N^{\oplus}(R_6)_2$—$A^{\ominus}$, wherein each $R_6$ is independently $C_{1-4}$alkyl, and $R_9'$ is as defined above, $B_1'$ is hydrogen, methyl, ethyl, hdyroxymethyl, hydroxethyl, cyclohexyl, benzyl, methoxyethyl or ethoxyethyl, each R' is independently methyl, ethyl, phenyl, benzyl or cyclohexyl, each $R_{28}'$ is independently hydrogen, chloro, methyl or methoxy, T'' is hydrogen, cyano or

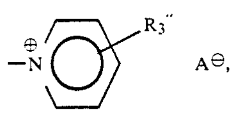

wherein $R_3''$ is hydrogen or methyl, $T_1''$ is hydrogen, cyano or —$CONH_2$, and X', when each $R_{28}'$ is hydrogen, is a direct bond, —$CH_2$—, —$(CH_2)_{23}$—, —$(CDH_2)_3$—, —$(CH_2)_4$—, —S—, —O—, —CH=CH—, —NH—, —CO—NH—,

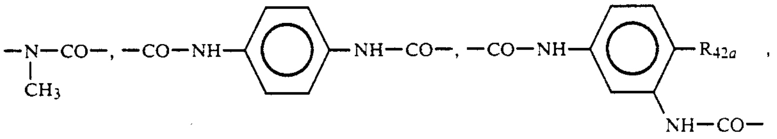

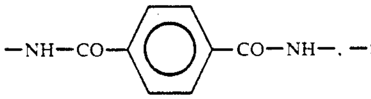 —$SO_2$—NH—, —NH—CO—$(CH_2)_2$—CO—NH—,

—NH—CO—$(CH_2)_4$—CO—NH—, 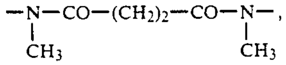

—NH—CO—CH=CH—CO—NH—, 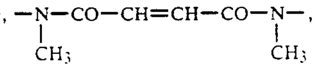

—NH—CO—NH—, 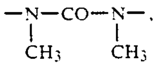 —CO—NH—NH—CO—,

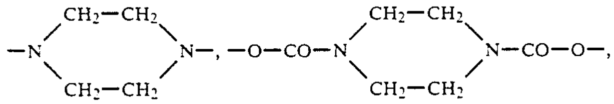

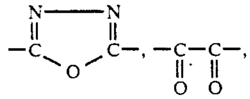 —O—$(CH_2)_g$—O—,

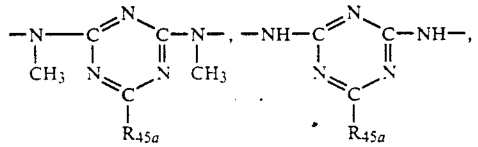

—CO—NH—$(CH_2)_2$—NH—CO—, —CO—NH—$(CH_2)_3$—NH—CO—,

—CO—NH—$(CH_2)_4$—NH—CO—, 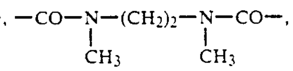

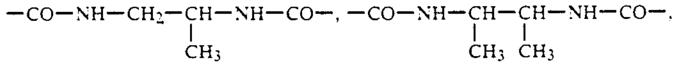

—$CH_2$—CO—$CH_2$—, —CH=CH—CH=CH—,

-continued

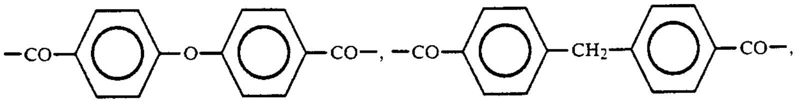

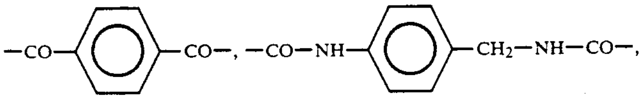

$-CH_2-CO-$, $-CH=CH-CO-CH=CH-$, $-CO-NH-R_{43}-CO-NH-$, $-CO-NH-(CH_2)_c-NH-CO-(CH_2)_2-CO-NH-(CH_2)_c-NH-CO-$,

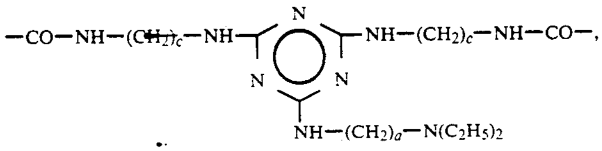

$-SO_2-NH-(CH_2)_a-NH-SO_2-$, $-CO-NH-(CH_2)_b-NH-CO-NH-(CH_2)_b-NH-CO-$ or

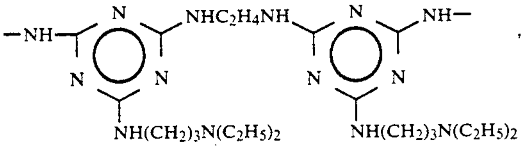

and, when at least one $R_{28}'$ is other than hydrogen, is a direct bond, $-CH_2-$, $-(CH_2)_2-$, $-CO-NH-$,

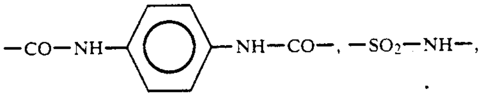

$-NH-CO-CH=CH-CO-NH-$, $-NH-CO-NH-$,

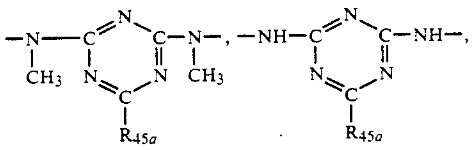

$-CO-NH-(CH_2)_2-NH-CO-$, $-CO-NH-(CH_2)_3-NH-CO-$,

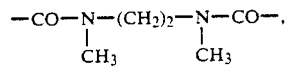

$-CO-NH-CR_{43}-CO-NH-$ or

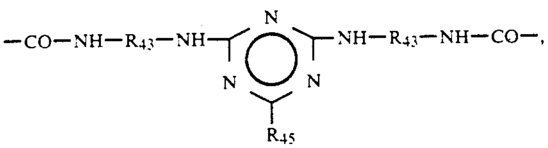

with the proviso that when X' is asymmetric, either end is attached to Ring A, wherein $R_{42a}$ is hydrogen, chloro, methyl or methoxy, each $R_{43}$ is independently linear or branched $C_{1-4}$alkylene, $R_{45}$ is halo, hydroxy, methoxy, ethoxy, amino, 2-hydroxyethylamino, N,N-di(2-hydroxyethyl)amino, $-NH-(CH_2)_a-N(C_2H_5)_2$, N-methyl-N-phenylamino, N-cyclohexyl-N-methylamino, piperidino or N-aminoethylpiperazino, $R_{45a}$ is chloro, hydroxy, methoxy, ethoxy, amino, 2-hydroxyethylamino, N,N-di-(2-hydroxyethyl)amino, 3-diethylaminopropylamino, N-methyl-N-phenylamino, N-cyclohexyl-N-methylamino, piperidino or N-aminoethylpiperazino, each c is 1 or 2, and g is 1, 2, 3 or 4, wherein each a is independently 2 or 3;

each b is independently 1, 2 or 3, and each $A^\ominus$ is independently a non-chromophoric anion, with the provisos that (i) X' is in the 3- or 4-position of each of Rings A and B independently and (ii) at least one of B' and T'' is or contains a water-solubizing protanatable basic group or a water-solubilizing cationic group.

4. A compound according to claim 3.

5. A compound according to claim 3 having the formula

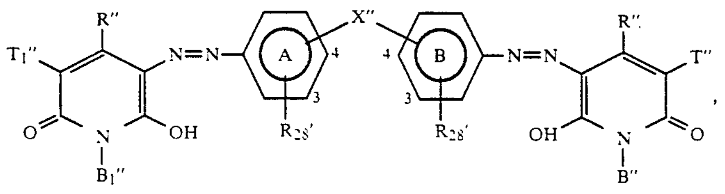

or an acid addition salt theeof, wherein

B″ is hydrogen, methyl, ethyl, hydroxymethyl, benzyl, $-(CH_2)_a-N(R_7'')_2$ or $-(CH_2)_a-N^{\oplus}(R_8'')_2R_9''A^{\ominus}$, wherein each $R_7''$ is independently hydrogen, methyl, ethyl or 2-hydroxyethyl, or $-N(R_7'')_2$ is piperidino, morpholino, piperazino or N-methylpiperazino, each $R_8''$ is independently methyl, ethyl or 2-hydroxyethyl, $R_9''$ is methyl, ethyl or benzyl, or $-N^{\oplus}(R_8'')_2R_9''$ is pyridinium, pyridinium monosubstituted or disubstituted by methyl or

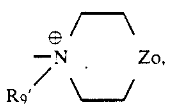

wherein

Zo is a direct bond, $-CH_2-$, $-O-$, $-S-$, $-SO-$, $-SO_2-$, $-NH-$, $-NR_6-$ or $-N^{\oplus}(R_6)_2-A^{\ominus}$, wherein each $R_6$ is independently $C_{1-4}$alkyl, and $R_9'$ is methyl, ethyl, propyl or benzyl, and a is 2 or 3, $B_1''$ is hydrogen, methyl, ethyl, hydroxymethyl, benzyl or methoxyethyl, each R″ is independently methyl or phenyl, $R_{28}'$ is hydrogen, chloro, methyl or methoxy, T″ is hydrogen, cyano or

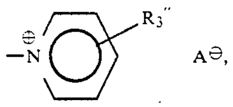

wherein $R_3''$ is hydrogen or methyl, $T_1''$ is hydrogen, cyano or $-CONH_2$, and X″ is a direct bond, $-(CH_2)_2-$, $-CO-NH-$,

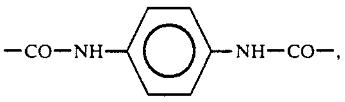

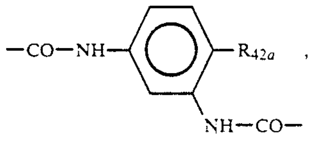

$-SO_2-NH-$, $-NH-CO-(CH_2)_2-CO-NH-$, $-NH-CO-(CH_2)_4-CO-NH-$,

-continued

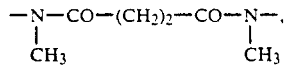

$-NH-CO-CH=CH-CO-NH-$,

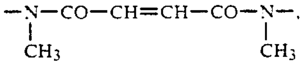 $-NH-CO-NH-$,

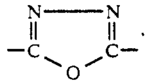 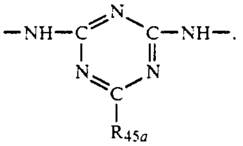

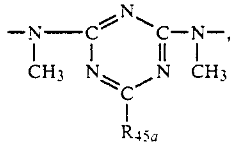

$-CO-NH-(CH_2)_2-NH-CO-$, $-CO-NH-(CH_2)_3-NH-CO-$, $-CO-NH-(CH_2)_4-NH-CO-$,

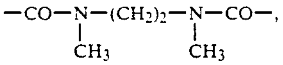

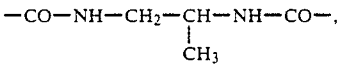

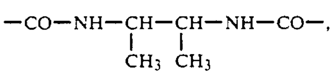

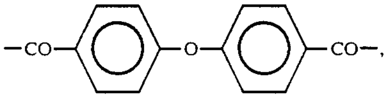

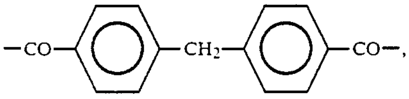

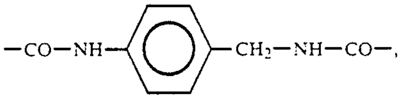

$-CO-NH-R_{43}-CO-NH-$ or

-continued

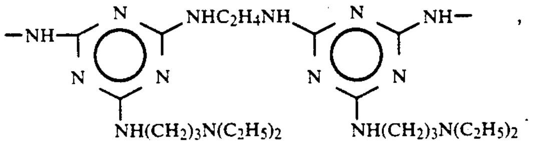

with the provisos that (i) when X'' is asymmetric, either end is attached to Ring A and (ii) when at least one $R_{28}'$ is other than hydrogen, X'' is a direct bond, $—(CH_2)_2—$, —CO—NH—,

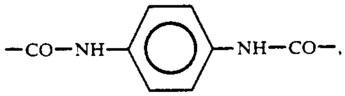

$—SO_2—NH—$,

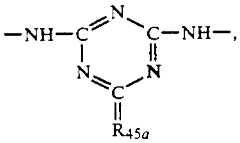

$—CO—NH—(CH_2)_2—NH—CO—$ or $—CO—NH—R_{43}—CO—NH—$, wherein $R_{42a}$ is hydrogen, chloro, methyl or methoxy, $R_{43}$ is linear or branched $C_{1-4}$alkylene, and $R_{45a}$ is chloro, hydroxy, methoxy, ethoxy, amino, 2-hydroxyethylamino, N,N-di-(2-hydroxyethyl-)amino, 3-diethylaminopropylamino, N-methyl-N-phenylamino, N-cyclohexyl-N-methylamino, piperidino or N-aminoethylpiperazino, wherein each $A^\ominus$ is independently a non-chromophoric anion, with the provisos that (i) X'' is in the 3- or 4-position of each of Rings A and B independently and (ii) at least one of B'' and T'' is or contains a water-solubilizing protonatable basic group or a water-solubilizing cationic group.

6. A compound according to claim 5.

7. An acid addition salt according to claim 5 having the formula

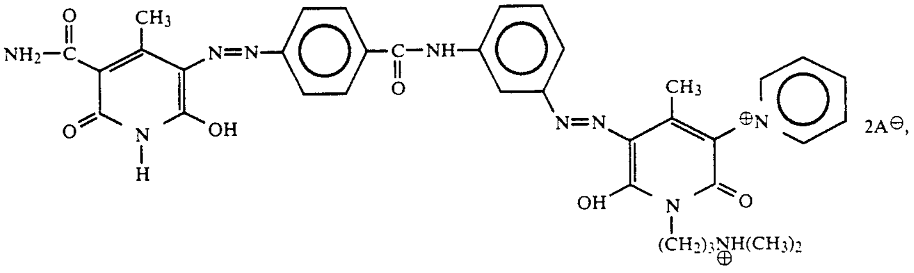

wherein each $A^\ominus$ is a non-chromophoric anion.

8. The acid addition salt according to claim 7 wherein each $A^\ominus$ is lactate.

9. A compound according to claim 6 having the formula

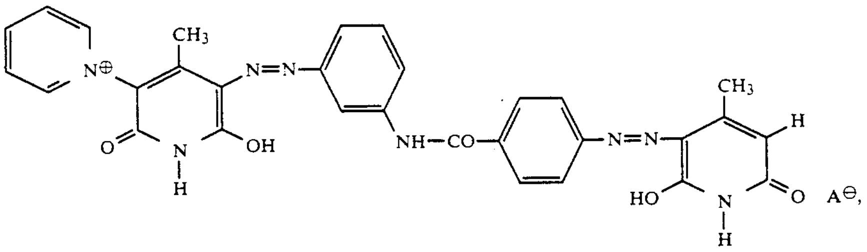

wherein $A^\ominus$ is a non-chromophoric anion.

10. A compound according to claim 6 having the formula

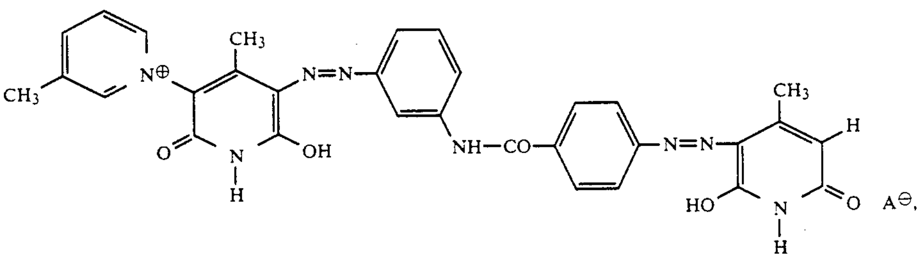

wherein $A^\ominus$ is a non-chromophoric anion.

11. A compound according to claim 6 having the formula

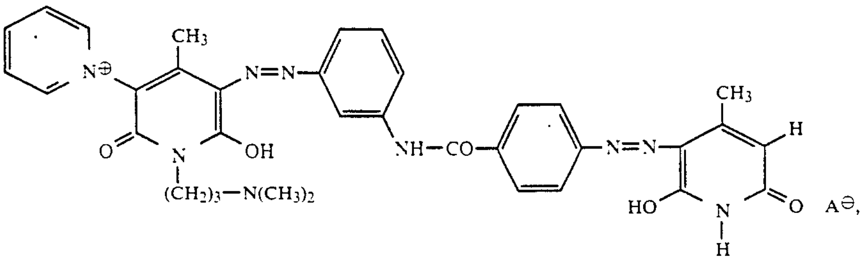

wherein A⊖ is a non-chromophoric anion.

12. A compound according to claim 6 having the formula

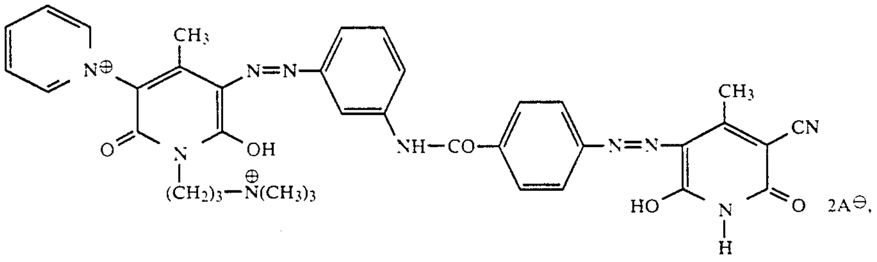

wherein each A⊖ is a non-chromophoric anion.

13. A compound according to claim 6 having the formula

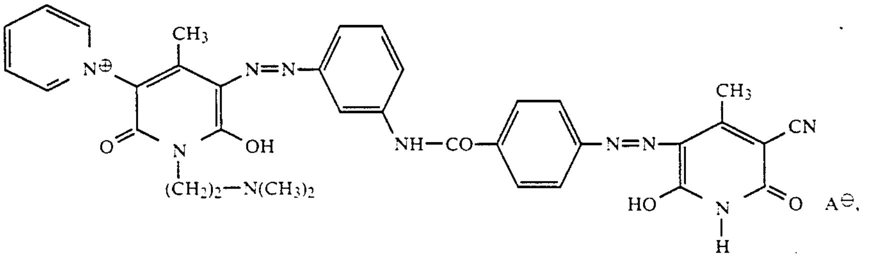

wherein A⊖ is a non-chromophoric anion.

14. A compound according to claim 6 having the formula

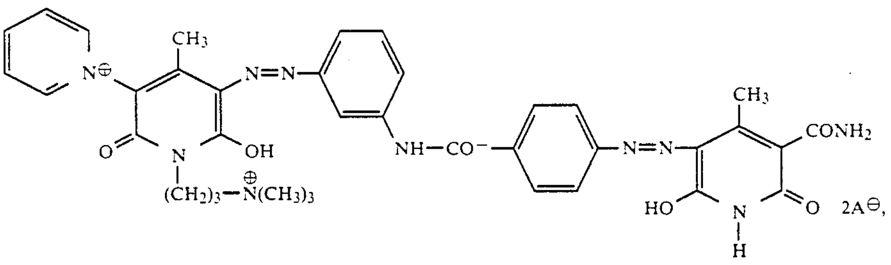

wherein each A⊖ is a non-chromophoric anion.

15. A compound according to claim 6 having the formula

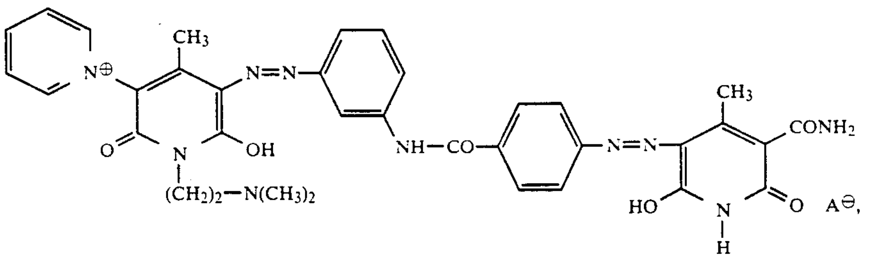

wherein A⊖ is a non-chromophoric anion.

16. A compound according to claim 6 having the formula

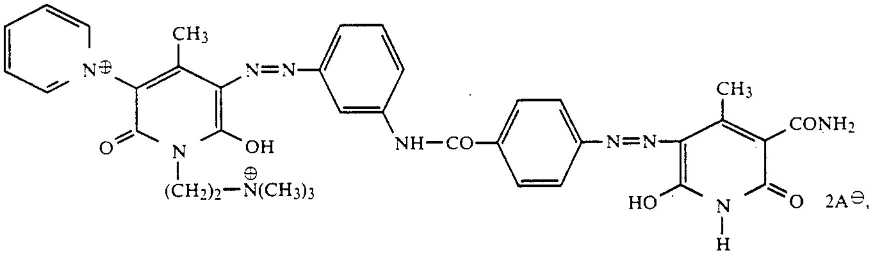

wherein A⊖ is a non-chromophoric anion.

17. A compound according to claim 6 having the formula

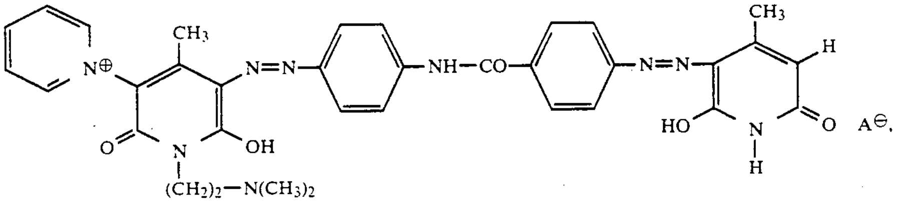

wherein A⊖ is a non-chromophoric anion.

18. A compound according to claim 6 having the formula

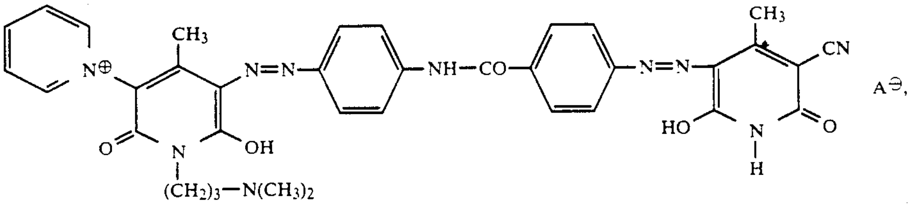

wherein A⊖ is a non-chromophoric anion.

19. A compound according to claim 6 having the formula

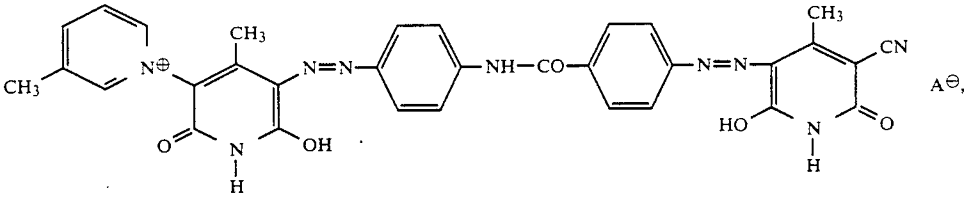

wherein A⊖ is a non-chromophoric anion.

* * * * *